3,080,482
RADIATION DETECTOR
Serge A. Scherbatskoy, 1220 E. 21st Place,
Tulsa 14, Okla.
Continuation of abandoned application Ser. No. 403,259, Jan. 11, 1954. This application Oct. 16, 1959, Ser. No. 846,873
4 Claims. (Cl. 250—83.3)

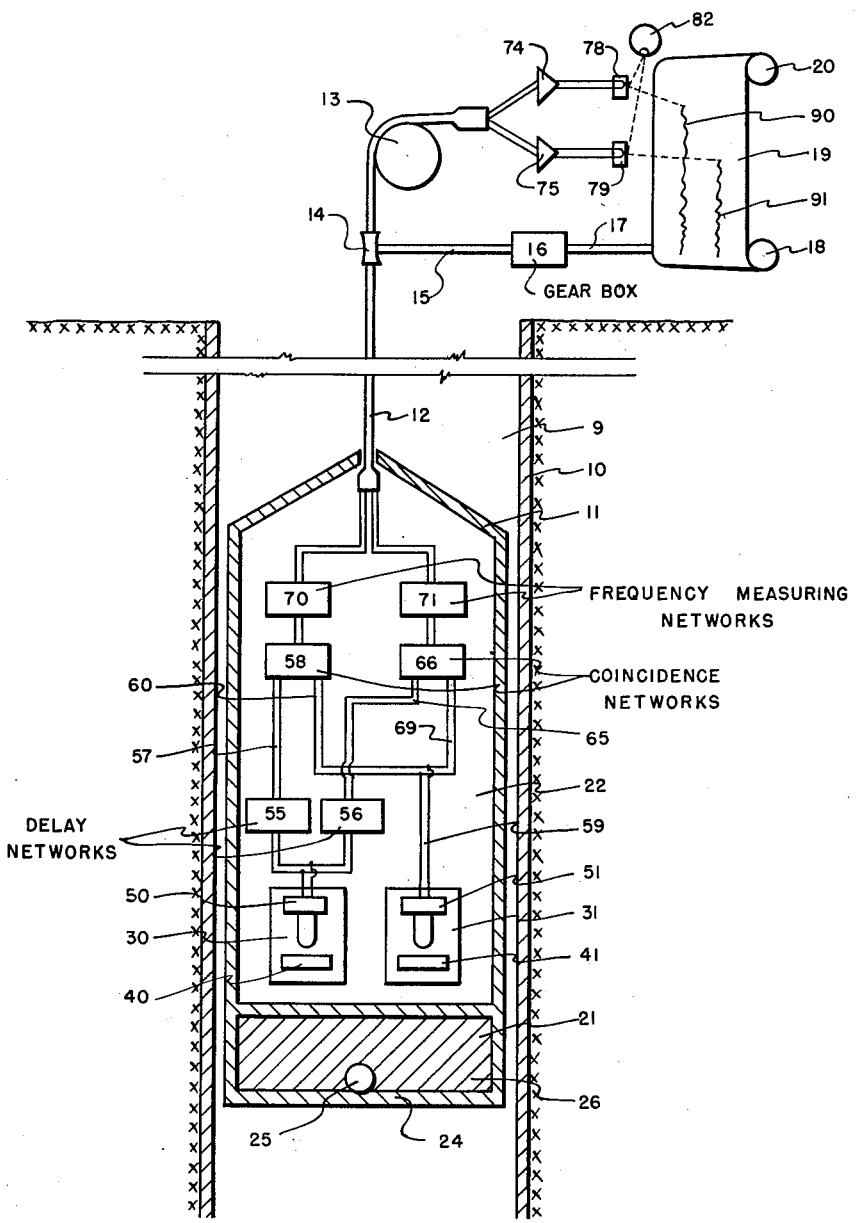

This invention is concerned with a radiation detector and apparatus for performing in a bore hole measurements of radiation resulting from nuclear transformations caused by an external source, such as a source of neutrons placed adjacent to said formations in the neighborhood of the detecting instrument.

This application is a continuation of my copending application Serial No. 403,259, entitled "Radiation Detector," filed January 11, 1954, now abandoned.

Many measurements have been made of the above radiations and particularly of gamma radiations. These gamma radiations result from naturally radioactive substances present in the formations or from the effect of irradiation of the formations with a stream of neutrons. The measurement of these radiations has been found useful in geophysical prospecting and in many instances the measurement of the radiations obtained from a geological stratum or sample taken from that stratum has yielded valuable information as to the nature of the stratum. Thus, to cite one specific example, an ionization chamber, either alone or accompanied with a source of neutrons, has been lowered into a bore hole in the earth and measurements were made at various levels of gamma radiations derived from the formations. These measurements, when correlated with measurements of the depth at which they were taken, have shown accurately the interfaces between the various strata and have even given good indications of the nature of some particular strata.

It is not always sufficient, however, to have merely a measurement of the total gamma radiation obtained from a particular stratum, formation, or sample. In many instances the total amount of radiation will be the same for a plurality of strata, and yet the strata and samples will vary widely in their nature. It has been found therefore desirable to have more specific information about the radiation obtained from a particular specimen under observation.

The present invention is concerned with a method and apparatus for distinguishing between gamma rays emitted by various elements that are present in the formations and upon the application of this method and apparatus to geophysical prospecting by the examination of the formations themselves at the surface of the earth, or even more especially by the examination of the formations below the surface of the earth through the medium of a bore hole.

An important feature of my invention consists in producing nuclear excitation in the formations adjoining a bore hole by means of an external agent such as a source of neutrons lowered into the bore hole and placed adjacent to said formations. Neutrons emitted by said source into said formations undergo numerous collisions as a result of which they slow down and eventually become captured by the target nuclei of various elements present in the formations. It is well known that each of said target nuclei, upon the capture of a neutron, produces a compound nucleus which is in a highly excited state and that this compound nucleus subsequently decays to the ground state by emitting one or more gamma ray photons. The degree of excitation of a compound nucelus depends upon the identity of the original nucleus that captured the neutron and varies roughly between 6 and 8 mev. The only exception is hydrogen, which upon neutron capture produces a compound nucleus having excitation energy of about 2.3 mev.

My invention is based upon the discovery that all compound nuclei do not lost their excitation energy in the same manner. Some nuclei subsequently to a neutron capture decay to the ground state in one single step by emitting one single gamma ray photon, the energy of said photon representing the total excitation energy of the compound nucleus. On the other hand, in the case of other nuclei the total excitation energy is not lost in form of a single quantum, and usually several quanta are emitted. In order to consider the behavior of such nuclei, take a specific example and assume that the nucleus upon the capture of a neutron produces a compound nucleus having excitation energy of 7 mev. This compound nucleus decays first to an intermediate energy state having excitation energy of 5 mev. Therefore, it emits a gamma ray having energy equal to the difference of the original excitation level of 7 mev. and the new excitation level of 5 mev. Thus, the photon emitted has the energy of 2 mev. Subsequently, the compound nucleus may decay further to the ground level by emitting a gamma ray of 5 mev. Consequently, the process of losing the excitation energy did not occur in one single step as in the previously mentioned case, since it took two steps for the compound nucleus to pass through an intermediate energy level to the ground state, each of said steps being accompanied by an emission of a gamma ray.

It is thus apparent that we can differentiate between various elements present in the formation by determining their behavior upon the capture of neutrons. Some of these elements emit two or more gamma rays that occur in coincidence, i.e., they are emitted substantially at the same time. Other elements emit gamma rays that occur in delayed coincidence, i.e., they emit gamma rays in succession that are separated one from the other by a determined time interval, the length of said time interval characterizing said element.

In accordance with the present invention, there is provided a method and apparatus for separately measuring the frequency of events characterized by a determined time interval separating two successive gamma ray emissions, and such measurement is representative of a relative abundance of the substance characterized by said time interval.

In some instances the lifetime of the intermediate state is very short and is smaller than $10^{-9}$ sec. and in such case we may assume that the two gamma rays in cascade occur simultaneously. This is the case when the difference between the angular momentum of the intermediate level and ground level is small.

However, in other instances there is a large difference between the angular momentum of the intermediate level and the ground level, and in such cases the lifetime of the intermediate state is relatively long and may last from $10^{-9}$ to $10^{-3}$ seconds. In such cases the two gamma rays in cascade do not occur simultaneously and there is a definite time interval separating these two events, the average length of said time interval representing the average lifetime of the intermediate level. The length of such a time interval is a characteristic of a given element. By continuously performing these measurements at various depth of the bore hole, one may produce logs representing individually relative quantitative variations of various elements present in the formations at said various depths.

It is an object of the present invention to provide an improved method and apparatus for determining the character and relative amounts of unknown substances, particularly adjacent to the bore hole.

Further objects and advantages of the present invention will become apparent as the following description proceeds and the features of novelty which characterize the invention will be pointed out with particularity in the claims annexed to and forming part of this specification.

For further details of a specific device embodying the principles of this invention and a more complete understanding of the mode of application of the principles of this invention and the numerous advantages thereof, reference may be had to the accompanying drawing which illustrates diagrammatically a bore hole which penetrates the strata of the earth and the general arrangement for measuring delayed coincidences resulting from the neutron irradiation of the formations at various depths within the bore hole.

Referring now to the drawing, there is schematically illustrated a bore hole 9 penetrating the formation to be explored. The bore hole is defined in the conventional manner by a tubular metallic casing designated as 10.

For the purpose of exploring the formation along the bore hole there is provided in accordance with the present invention exploratory apparatus comprising a housing 11 which is lowered into the bore hole 9 by means of a cable 12, preferably including as a part thereof suitable insulating conductors. The cable 12 has a length somewhat in excess of the depth of the bore hole to be explored and is normally wound on a drum 13 positioned above the bore hole opening. The cable 12 may be unwound from the drum 13 to lower the exploring apparatus into the bore hole 9 and may be rewound upon the drum 13 to raise the exploring apparatus.

In order to determine the depth of the exploratory apparatus within the bore hole 9 at any time, there is provided a measuring reel 14 engaging the cable 12 above the bore hole and adjusted to roll on the cable in such a manner that the number of revolutions of the reel 14 corresponds to the amount of cable which has moved past the reel in either direction. The reel 14 is mounted on a shaft 15, and rotation of the reel and consequently of the shaft 15 is transmitted through a gear box 16 to another shaft 17 which is drivingly connected to take up spool 18 for moving a photographic film 19 from a feed spool 20 to take up spool 18.

As illustrated in the drawing, the housing of the exploratory apparatus is divided into two sections designated by numerals 21 and 22, respectively. In the section 21 there is provided a solid support 24 on which is disposed a suitable source of neutrons generally designated as 25; such as, for example, a radium beryllium preparation which may be enclosed in a container of a suitable material such as glass. Instead of radium beryllium preparation, the source of neutrons may comprise for instance, a discharge tube adapted to bombard a beryllium or lithium composition with deuterons, thus causing a generation of neutrons in a manner understood by those skilled in the art. The neutron source 25 is enclosed within a jacket 26 made of a material such as lead which allows the neutron rays to pass completely, or for the great part, therethrough.

The section 22 comprises two detectors designated by numerals 30 and 31. Each detector is of scintillation counter type and comprises a crystal in combination with a photomultiplier. The crystals comprised in the detectors 30 and 31 are designated by numerals 40 and 41, respectively, and the corresponding photomultipliers are designated by numerals 50 and 51, respectively. The crystals are adapted to convert the incoming gamma rays into impulses of light which subsequently impinge upon the corresponding photomultipliers provided with a suitable voltage supply. We obtain thus across the output terminals of each detector an electrical impulse which coincides in time with the arrival of a gamma ray photon. The crystal may be anthracene or any other substance that will emit light when exposed to gamma radiation.

The photomultiplier has a cathode provided with photosensitive surface such as caesium.

It is apparent that instead of scintillation counters, the blocks 30 and 31 may designate any other high efficiency gamma ray counters such as crystal counters or Geiger counters of very high efficiency.

The output of the Scintillation counter 50 is connected to two delay networks 55 and 56, said networks being adapted to delay the incoming impulses by predetermined time intervals $T_1$ and $T_2$, respectively. Thus the delay network 55 upon the reception of a current impulse from the Scintillation counter 30 produces in its output another current impulse delayed with respect to the incoming impulse by an amount $T_1$. Similarly, the delay network 56 upon the reception of the same impulse from the counter 30 produces in its output another current impulse delayed with respect to the incoming impulse by an amount $T_2$. The values $T_1$ and $T_2$ characterize a given network and are usually comprised between $10^{-9}$ sec. and $10^{-3}$ sec.. The delay networks are well known in the art and their description can be found, for instance, in the "Experimental Nuclear Physics" by E. Segre, vol. I, pp. 104–110, John Wiley & Sons, New York, N.Y., 1953.

The output terminals of the delay network 55 are connected through leads 57 to the input terminals of coincidence network 58 and the output terminals of the Scintillation counter 31 are connected through leads 59 and 60 to the other pair of input terminals of the coincidence network 58.

Similarly, the output terminals of the delay network 56 are connected through leads 65 to the input terminals of the coincidence network 66 and the output terminals of the Scintillation counter 30 are connected through leads 59 and 69 to the other input terminals of the coincidence network 66.

The coincidence networks are well known in the art and their description cna be found, for instances, on pages 104–110 of the above-referred to book by E. Segre. In particular, the network 58 is adapted to produce across its output terminals an impulse whenever current impulses derived from the leads 57 and 60 arrive in coincidence. Similarly, the network 66 produces an impulse whenever current impulses derived from the leads 65 and 69 arrive in coincidence.

The output terminals of the coincidence networks 58, 66 are connected to the frequency measuring networks 70, 71 which have in turn their outputs connected to the cable 12. The frequency measuring networks are well known in the art and are adapted to produce across their output terminals D.C. voltages representing the frequencies of impulses applied to their input terminals. We obtain thus in the output of the network 70 a voltage representing the frequency of impulses derived from the coincidence network 58, and similarly the voltage output of the network 71 represents the frequency of impulses derived from the coincidence network 66.

The outputs of frequency measuring networks 70, 71 are transmitted through insulated conductors associated with the cable 12 to the top of the drill hole. These outputs are subsequently amplified in amplifiers 74 and 75, respectively, located above the opening to the bore hole and are connected to the galvanometer coils 78 and 79, respectively. The galvanometer coils have attached thereto suitable mirrors in a manner well known to those skilled in the art and are adapted to reflect beams of light derived from a source 82, thereby effectively producing on the sensitive film 19 a record comprising four traces designated as 90 and 91, respectively, and representing the variations of the voltages applied to the galvanometers 78 and 79, respectively.

It is apparent that the neutrons radiated from the source 25 into the formations undergo numerous collisions as a result of which they slow down and become eventually captured by various elements in the formation.

The capture of each neutron results in an emission either of a single gamma ray or of two or more gamma rays that occur simultaneously or are separated by determined time intervals, the length of said time intervals characterizing the emitting elements. These gamma rays produce corresponding impulses across the outputs of the detectors 30 and 31.

The delay network 55 delays the impulses produced by the detector 30 by an amount $T_1$ and the coincidence network 58 signals the simultaneous occurrence of the impulses derived from the detector 31 and said delayed impulses. It is apparent that the frequency of such occurrence represented by the output voltage of the network 70 represents the relative abundance of the element characterized by the delay $T_1$.

Similarly, the delay network 56 delays the impulses produced by the detector 30 by an amount $T_2$ and the coincidence network 66 signals the simultaneous occurrence of the impulses derived from the detector 31 and said delayed impulses. The frequency of such occurrence represented by the output voltage of the network 71 represents the relative abundance of the element characterized by the delay $T_2$.

The outputs of the networks 70 and 71 are separately transmitted through insulated conductors associated with the cable 12 to the top of the drill hole and are separately recorded on photographic paper 19 in form of traces 90 and 91, respectively. Thus these traces represent the variation with respect to depth of the relative amounts of elements that are present in the formation and characterized by the values $T_1$ and $T_2$.

I claim:

1. In an apparatus for radiological logging of bore holes, a housing adapted to be lowered into a bore hole, said housing comprising a source of neutrons arranged to radiate neutrons into the formations surrounding said bore hole whereby gamma rays are emitted as a result of interaction of said neutrons with said formations, two gamma ray counters, each of said counters adapted to produce an electrical impulse in response to a gamma ray, a delay network connected to the output of one of said counters for delaying the impulses derived from said output by a determined time interval, a coincidence network responsive to said delayed impulses and to the impulses derived from said other counter for producing a signal whenever said impulses occur in coincidence, means for lowering said housing, means for determining the depth at which said housing is lowered, and means for recording the output of said coincidence network in correlation with depth.

2. In an apparatus for radiological logging of bore holes, a housing adapted to be lowered into a bore hole, said housing comprising two gamma ray counters, each of said counters adapted to produce an impulse in response to an incoming gamma ray, a coincidence circuit and a delay network for delaying impulses traversing said network by a predetermined time interval, said coincidence circuit having one of its input channels connected through said delay network to one of said counters, and having another input channel connected to the other counter, a second coincidence circuit and a second delay network for delaying impulses traversing said network by a different time interval, said other coincidence circuit having one of its input channels connected through said other delay network to one of said counters and having another input channel connected to the other counter, means for lowering said housing, means for determining the depth at which said housing is lowered, and means for separately recording the outputs of said two coincidence networks in correlation with depth.

3. In an apparatus for radiological logging of bore holes, a housing adapted to be lowered into a bore hole, said housing comprising a source of neutrons arranged to radiate neutrons into the formations surrounding said bore hole, whereby gamma rays are emitted as a result of interaction of said neutrons with said formation, two gamma ray counters, each of said counters adapted to produce an electrical impulse in response to a gamma ray, a coincidence circuit and a delay network for delaying the impulses traversing said network by a predetermined time interval, said coincidence circuit having one of its input channels connected through said delay network to one of said counters and having another input channel connected to the other counter, a second coincidence circuit and a second delay network for delaying impulses traversing said network by a different time interval, said other coincidence circuit having one of its input channels connected through said other delay network to one of said counters and having another input channel connected to the other counter, means for lowering said housing, means for determining the depth at which said housing is lowered, and means for separately recording the outputs of said two coincidence networks in correlation with depth.

4. In apparatus for determining the character of an unknown substance, a source of neutrons arranged to irradiate neutrons into such substance whereby gamma rays are emitted as the result of interaction of said neutrons therewith, two gamma-ray detectors, each of said detectors being adapted to produce electric impulses in response to gamma rays impinging thereon, a delay network connected to the output of one of said detectors for delaying by a predetermined time interval the impulses derived from said output, a coincidence network responsive to said delayed impulses and to the impulses derived from said other detector for producing a signal whenever such impulses occur in substantial time coincidence, and means for producing a signal representing the rate of occurrence of said coincidence-network signals.

References Cited in the file of this patent

UNITED STATES PATENTS

| | | |
|---|---|---|
| 2,517,404 | Morton | Aug. 1, 1950 |
| 2,563,333 | Herzog | Aug. 7, 1951 |
| 2,610,303 | Bell | Sept. 9, 1952 |
| 2,617,042 | Wouters | Nov. 4, 1952 |
| 2,636,993 | Jakobson | Apr. 28, 1953 |
| 2,740,898 | Youmans | Apr. 3, 1956 |